(12) United States Patent
Lee et al.

(10) Patent No.: US 10,809,457 B2
(45) Date of Patent: Oct. 20, 2020

(54) OPTICAL CIRCUIT ELEMENT

(71) Applicant: ELECTRONICS AND TELECOMMUNICATIONS RESEARCH INSTITUTE, Daejeon (KR)

(72) Inventors: Seo Young Lee, Daejeon (KR); Young-Tak Han, Daejeon (KR)

(73) Assignee: Electronics and Telecommuncations Research Institute, Daejeon (KR)

( * ) Notice: Subject to any disclaimer, the term of this patent is extended or adjusted under 35 U.S.C. 154(b) by 0 days.

(21) Appl. No.: 16/373,551

(22) Filed: Apr. 2, 2019

(65) Prior Publication Data
US 2019/0302362 A1    Oct. 3, 2019

(30) Foreign Application Priority Data

Apr. 3, 2018  (KR) ................. 10-2018-0038833

(51) Int. Cl.
| | |
|---|---|
| *G02B 6/126* | (2006.01) |
| *G02B 6/122* | (2006.01) |
| *G02B 6/10* | (2006.01) |
| *G02B 6/12* | (2006.01) |

(52) U.S. Cl.
CPC ........... *G02B 6/126* (2013.01); *G02B 6/122* (2013.01); *G02B 6/1228* (2013.01); *G02B 6/105* (2013.01); *G02B 2006/1215* (2013.01); *G02B 2006/12116* (2013.01)

(58) Field of Classification Search
None
See application file for complete search history.

(56) References Cited

U.S. PATENT DOCUMENTS

| | | | |
|---|---|---|---|
| 6,937,799 B2 | 8/2005 | Matsushima et al. | |
| 7,174,070 B2 | 2/2007 | Kim et al. | |
| 8,131,120 B2 | 3/2012 | Doerr | |
| 9,590,135 B2 | 3/2017 | Oh et al. | |
| 2001/0036338 A1* | 11/2001 | Matsushima | G02B 6/12004 385/50 |

(Continued)

FOREIGN PATENT DOCUMENTS

| | | |
|---|---|---|
| KR | 10-2011-0040938 A | 4/2011 |
| KR | 10-1481148 B1 | 1/2015 |

(Continued)

OTHER PUBLICATIONS

L. B. Soldano, et al., "Mach-Zehnder Interferometer Polarization Splitter in InGaAsP/InP", IEEE Photonics Technology Letters, vol. 6, No. 3, pp. 402-405, Mar. 1994.

(Continued)

*Primary Examiner* — Jerry Rahll
(74) *Attorney, Agent, or Firm* — Rabin & Berdo, P.C.

(57) ABSTRACT

Provided is an optical circuit element, and more particularly, is an optical circuit element that splits one optical signal into two polarization signals, or couples two polarization signals into one optical signal. The optical circuit element includes a plurality of input couplers to which an optical signal is input, a plurality of output couplers from which an optical signal is output, a first path and a second path configured to connect the input couplers and the second couplers to each other, and at least one wave plate.

15 Claims, 10 Drawing Sheets

(56) References Cited

U.S. PATENT DOCUMENTS

| | | | | |
|---|---|---|---|---|
| 2010/0053731 A1* | 3/2010 | Hasegawa | ............... | G02F 2/00 |
| | | | | 359/325 |
| 2010/0119189 A1* | 5/2010 | Nasu | ................ | G02B 6/12007 |
| | | | | 385/1 |
| 2012/0162746 A1* | 6/2012 | Kawashima | ......... | G02B 6/2861 |
| | | | | 359/325 |
| 2013/0301976 A1 | 11/2013 | Saida et al. | | |
| 2013/0301977 A1* | 11/2013 | Saida | ................... | G02B 6/126 |
| | | | | 385/11 |

FOREIGN PATENT DOCUMENTS

| | | |
|---|---|---|
| WO | WO-2010/021671 A2 | 2/2010 |
| WO | WO-2012/102039 A1 | 8/2012 |

OTHER PUBLICATIONS

M.H. Chou, et al., "Adiabatically tapered periodic segmentation of channel waveguides for mode-size transformation and fundamental mode excitation", Optics Letters, vol. 21, No. 11, pp. 794-796, Jun. 1, 1996.

Bert Luyssaert, et al., "Efficient Nonadiabatic Planar Waveguide Tapers", Journal of Lightwave Technology, vol. 23, No. 8, pp. 2462-2468, Aug. 2005.

Michael M. Spühler, et al., "A Very Short Planar Silica Spot-Size Converter Using a Nonperiodic Segmented Waveguide", Journal of Lightwave Technology, vol. 16, No. 9, pp. 1680-1685, Sep. 1998.

\* cited by examiner

OPTICAL CIRCUIT ELEMENT

CROSS-REFERENCE TO RELATED APPLICATIONS

This U.S. non-provisional patent application claims priority under 35 U.S.C. § 119 of Korean Patent Application No. 10-2018-0038833, filed on Apr. 3, 2018, the entire contents of which are hereby incorporated by reference.

BACKGROUND

The present disclosure herein relates to an optical circuit element, and more particularly, to an optical circuit element that splits one optical signal into two polarization signals, or couples two polarization signals into one optical signal.

A polarization beam splitter (PBS) is an element configured to split a light beam, which is input in both a transverse electric (TE) mode and a transverse magnetic (TM) mode, into two light beams to be input to respective ports. A planar lightwave circuit (PLC)-type PBS has advantages in cost and size because it can be easily integrated with another PLC elements. In addition, the PLC-type PBS may be used in an optical communication module configured to perform functions of polarization shift modulation and polarization multiplexing. The PLC-type PBS has the structure of a Mach-Zehnder interferometer, which splits an incident light beam according to polarization, when the phase difference between horizontal polarization and vertical polarization of two optical paths becomes 180 degrees. The phases of the two optical paths may be controlled by a birefringence of a optical waveguide or a wave plate inserted in the slit of a optical waveguide.

SUMMARY

The present disclosure provides an optical circuit element capable of minimizing an insertion loss caused by a slit configured to be inserted with a wave plate.

The present disclosure also provides an optical circuit element capable of minimizing the number of wave plates to be used.

An embodiment of the inventive concept provides an optical circuit element including: a plurality of input couplers to which an optical signal is input; a plurality of output couplers from which an optical signal is output; a first path and a second path configured to connect the input couplers and the second couplers to each other; and at least one wave plate, wherein the first path includes a plurality of first input waveguides respectively connected to the input couplers, a plurality of first output waveguides respectively connected to the output couplers, a plurality of first spot size converters respectively connected to the first input waveguides, a plurality of second spot size converters connected to the first output waveguides, and a first slit between the first and second spot size converters, the second path includes a plurality of second input waveguides respectively connected to the input couplers, a plurality of second output waveguides respectively connected to the output couplers, a plurality of third spot size converters respectively connected to the second input waveguides, a plurality of fourth spot size converters connected to the second output waveguides, and a second slit between the third and fourth spot size converters, and the at least one wave plate is inserted into at least one of the first and second slits.

In an embodiment, each of the first to fourth spot size converters may include cores separated from each other.

In an embodiment, the first spot size converters and the third spot size converters may be separated in parallel so as to minimize the crosstalk, and the second spot size converters and the fourth spot size converters may be separated in parallel so as to minimize the crosstalk.

In an embodiment, the first and second slits are provided through a dicing process or a dry etching process.

In an embodiment, a thickness of the at least one wave plate may be about 8 μm to about 20 μm.

In an embodiment, a refractive index matching epoxy of which hardness is changeable may be filled in the at least one of the first and second slits.

In an embodiment, at least one of the first input waveguides and at least one of the second input waveguides may intersect with each other and have an intersection angle of 30 to 150 degrees, and at least one of the first output waveguides and at least one of the second output waveguides may intersect with each other and have an intersection angle of 30 to 150 degrees.

In an embodiment, at least one of the first input waveguides and at least one of the second input waveguides may intersect with each other and respectively have spot size converters disposed at an intersection point, and at least one of the first output waveguides and at least one of the second output waveguides may intersect with each other and respectively have spot size converters disposed at an intersection point.

In an embodiment, a first wave plate may be inserted into the first slit, the first wave plate may be a ¼ wave plate having a first optical axis, a second wave plate may be inserted into the second slit, and the second wave plate may be a ¼ wave plate having a second optical axis that has an angle difference of 90 degrees from the first optical axis.

In an embodiment, the one wave plate may be inserted in the first slit and the second slit, a part of the wave plate disposed in the first slit may have a first optical axis, and a part of the wave plate disposed in the second slit may have a second optical axis that has an angle difference of 90 degrees from the first optical axis, and the wave plate may be a ¼ wave plate.

In an embodiment, the wave plate may be a ½ wave plate that is inserted into the first slit, but is not inserted into the second slit.

In an embodiment, each of the input couplers may receive one optical signal, and each of the output couplers may output two optical signals.

In an embodiment, each of the input couplers may receive two optical signals, and each of the output couplers may output one optical signal.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Advantages and features of the present invention, and methods for achieving the same will be cleared with reference to exemplary embodiments described later in detail together with the accompanying drawings. However, the present invention is not limited to the following exemplary embodiments, but realized in various forms. In other words, the present exemplary embodiments are provided just to complete disclosure the present invention and make a person having an ordinary skill in the art understand the scope of the invention. The present invention should be defined by only the scope of the accompanying claims. Throughout this specification, like numerals refer to like elements.

The terminology used herein is for the purpose of describing particular embodiments only and is not intended to limit the scope of the present disclosure. As used herein, the singular forms "a", "an" and "the" are intended to include the plural forms as well, unless the context clearly indicates otherwise. It will be further understood that the terms "comprises" and/or "comprising" used herein specify the presence of stated components, operations and/or elements but do not preclude the presence or addition of one or more other components, operations and/or elements.

Hereinafter, embodiments of the inventive concept will be described with reference to the accompanying drawings.

Figure 1:
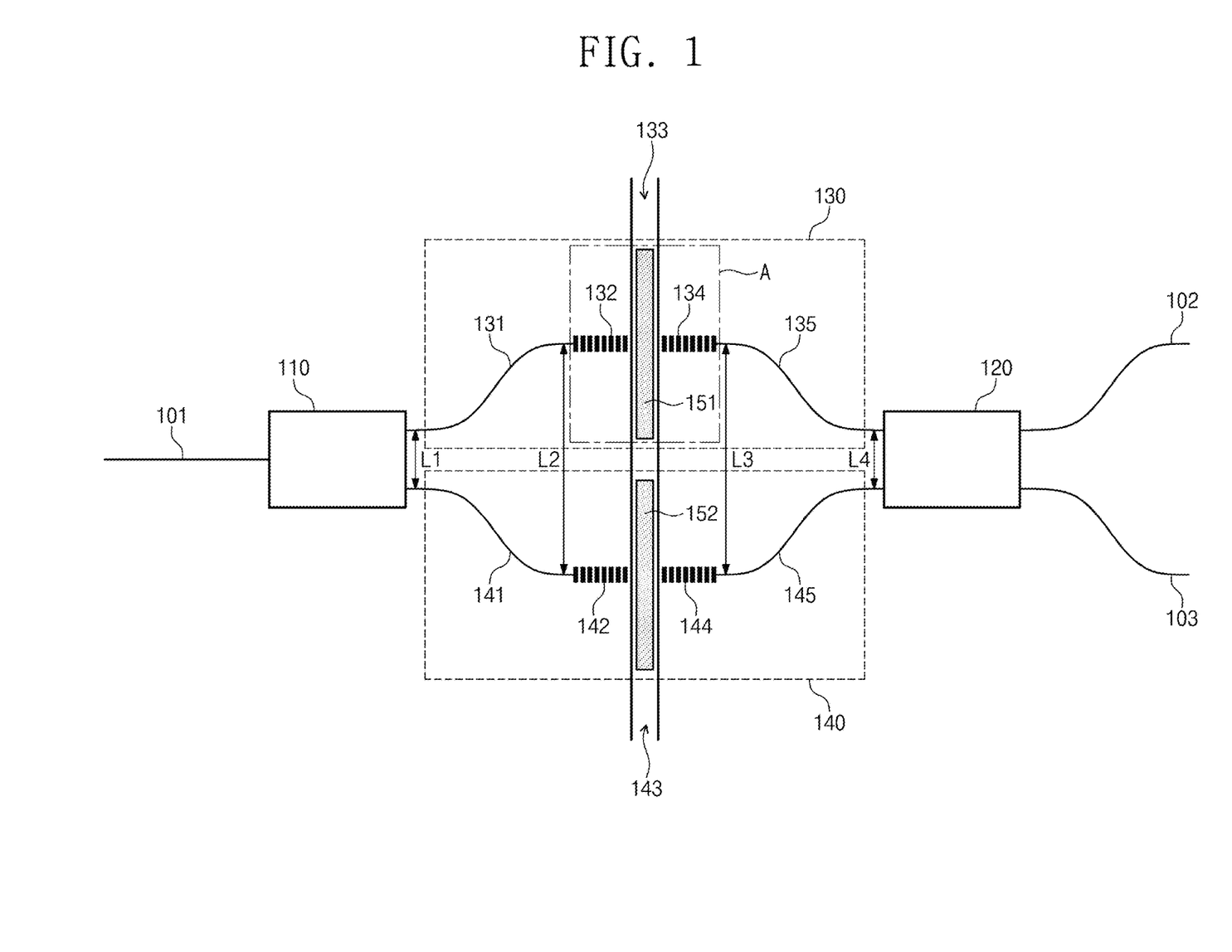
FIG. 1 is a drawing for describing an optical circuit element according to a first embodiment of the inventive concept.

FIG. 1 is a drawing for describing an optical circuit element according to a first embodiment of the inventive concept.

In relation to FIG. 1, the optical circuit element according to the first embodiment of the inventive concept may include an input part 101, an input coupler 110 to which an optical signal is input from the input part 101, a first output part 102 and a second output part 103, an output coupler 120 configured to output optical signals to the first and second output parts 102 and 103, a first path 130 and a second path 140 configured to connect the input coupler 110 with the output coupler 120, and wave plates 151 and 152. The optical circuit element according to the first embodiment of the inventive concept may have a Mach-Zehnder interferometer structure.

The first path 130 may include a first input waveguide 131 connected to the input coupler 110, a first output waveguide 135 connected to the output coupler 120, a first spot size converter 132 connected to the first input waveguide 131, a second spot size converter 134 connected to the first output waveguide 135, and a first slit 133 provided between the first spot size converter 132 and the second spot size converter 134.

The second path 140 may include a second input waveguide 141 connected to the input coupler 110, a second output waveguide 145 connected to the output coupler 120, a third spot size converter 142 connected to the second input waveguide 141, a fourth spot size converter 144 connected to the second output waveguide 145, and a second slit 143 provided between the third spot size converter 142 and the fourth spot size converter 144.

The input coupler 110 may receive one optical signal and output two optical signals. The input coupler 110 may output the optical signals to the first input waveguide 131 and the second input waveguide 141. The input coupler 110 may be a 1×2 or 2×2 multi-mode interference coupler, a 1×2 splitter, or a 2×2 directional coupler.

The first and second input waveguides 131 and 141 may transfer the optical signals transferred from the input coupler 110 to the first and third spot size converters 132 and 142. Each of the first and second input waveguides 131 and 141 may be provided in a curved type. The first and second input waveguides 131 and 141 may be provided in such a way that the distance L1 between parts connected to the input coupler 110 is shorter than the distance L2 between parts connected to the first and third spot size converters 132 and 142.

Figure 2A:
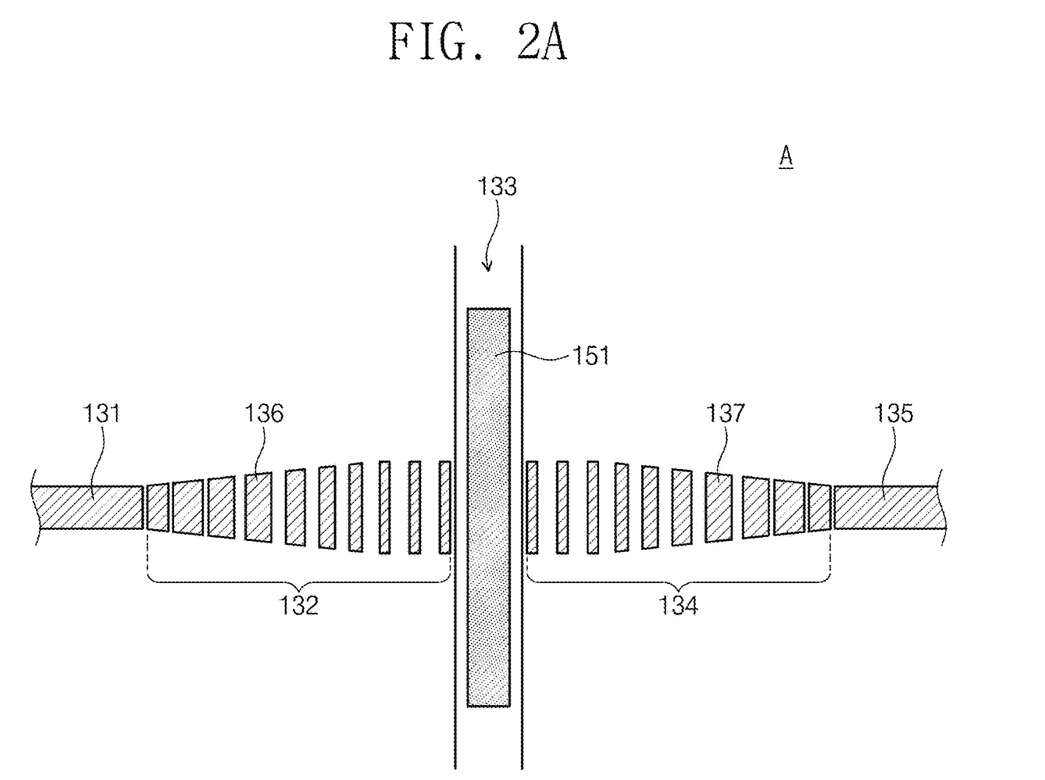
FIG. 2A is an enlarged view of A region of FIG. 1.

The first to fourth spot size converters 132, 134, 142 and 144 may transfer the optical signals transferred from the first and second input waveguides 131 and 141 to the first and second output waveguides 135 and 145. In the transfer process, the optical signals may pass the slits 133 and 143. The first spot size converter 132 and the third spot size converter 142, the second spot size converter 134 and the fourth spot size converter 144 may be separated in parallel in order to minimize the crosstalk between the optical signals. The first to fourth spot size converters 132, 134, 142, and 144 will be described later in relation to FIG. 2.

The first slit 133 is a substantially empty space provided between the first and second spot size converters 132 and 134. The second slit 143 is a substantially empty space provided between the third and fourth spot size converters 142 and 144. The thicknesses of the slits may be about 10 µm to about 30 µm. The slits 133 and 143 may be provided through a dicing process or a dry etching process. When the dicing process is employed, the first and second slit 133 and 143 having the same thickness may be provided between the first to fourth spot mode converters 132, 134, 142 and 144 in one process.

The first and second wave plates 151 and 152 may be inserted into the first and second slits 133 and 143. The first and second wave plates 151 and 152 may be vertically inserted with respect to the length direction of the first to fourth spot size converters 132, 134, 142 and 144. The first and second wave plates 151 and 152 may have the thicknesses of about 8 µm to about 20 µm. Since the first and second wave plates 151 and 152 are to be inserted into the first and second slits 133 and 143, the thicknesses of the first and second wave plates 151 and 152 are required to be smaller than those of the first and second slits 133 and 143. The first and second wave plates 151 and 152 may have the length of several hundred µm.

The optical signals passing through the first and second slits 133 and 143 may include a first polarization component and a second polarization component. For example, the first polarization component may be a vertical polarization component, and the second polarization component may be a horizontal polarization component. The first and second wave plates 151 and 152 may change the phase of a specific polarization component between the optical signals passing through the first and second slits 133 and 143. In other words, the first and second wave plates 151 and 152 may be a birefringent medium. The first wave plate 151 may be inserted into the first slit 133. For example, the first wave plate 151 may be a ¼ wave plate having a first optical axis. The second wave plate 152 may be inserted into the second slit 143. For example, the second wave plate 152 may be a ¼ wave plate having a second optical axis that has an angle difference of 90 degrees from the first optical axis. The phase of the first polarization component of the optical signal passing through the first wave plate 151 may be delayed by 90 degrees. The phase of the second polarization component of the optical signal passing through the second wavelength plate 152 may be advanced by 90 degrees. Consequently, the first polarization components and the second polarization components of the optical signals passing through the first and second path 130 and 140 may have the total phase difference of 180 degrees.

The first and second output waveguides 135 and 145 transfer the optical signals transferred from the second and fourth spot size converters 134 and 144 to the output coupler 120. Each of the first and second output waveguides 135 and 145 may be provided in a curved type. The first and second output waveguides 135 and 145 may be provided in such a way that the distance L3 between parts connected to the second and fourth spot size converters 134 and 144 is longer than the distance L4 between parts connected to the output coupler 120.

The output coupler 120 receives two optical signals and outputs two optical signals. The output coupler 120 may be a 2×2 directional coupler or a 2×2 multi-mode interference coupler. When optical signals passing through the first and second path 130 and 140 may have the total phase difference of 180 degrees, the optical signals may be separated into two polarization signal. The output coupler 120 may output a first polarization and a second polarization signal to the first output part 102 and the second output part 103.

Consequently, the optical circuit element according to the first embodiment of the inventive concept may be a polarization splitter configured to output two optical signals from one input signal. All the components of the optical circuit element according to the above-described first embodiment of the inventive concept may be provided on a single plate. Accordingly, it is advantageous in cost reduction and integration.

FIG. 2A is an enlarged view of A region of FIG. 1.

In relation to FIG. 2A, the spot size converter 132 may include first cores 136. The first cores 136 may be separated from each other along the length direction of the first spot size converter 132. As the first cores 136 are disposed closer to the first input waveguide 131, the thicknesses become thicker, the lengths become shorter, and the effective refractive index becomes higher. As the first cores 136 are disposed closer to the first slit 133, the thicknesses become thinner, the lengths become longer, and the effective refractive index becomes lower. As the optical signal passes through the first cores 136 of the first spot size converter 132, a beam diameter of the optical signal gradually becomes larger. Since the optical signal having the larger beam diameter has less diffraction, the optical signal that has passed through the first cores 136 may not have the large optical insertion loss when passing through the first slit 133. In comparison to those provided consecutively, the first cores 136 provided separately from each other have an advantage of increasing the beam diameter of the optical signal not only in the horizontal direction but also in the vertical direction. However, a single mode of the optical signal must be maintained while the optical beam diameter of the optical signal increases. The optical signal fail to maintain in single mode will excited to a higher optical mode and lead to the optical loss in the element. In comparison to those provided consecutively, the first cores 136 provided separately from each other may have the better excitation efficiency in the single mode, and thus may further stably maintain the single mode of the optical signal.

The second spot size converter 134 may include the second cores 137. The second cores 137 may be separated from each other along the length direction of the second spot size converter 134. As the second cores 137 are disposed closer to the first output waveguide 135, the thickness become thicker, the lengths become shorter, and the effective refractive index becomes higher. As the second cores 137 are disposed closer to the first slit 133, the thickness become thinner, the lengths become longer, and the effective refractive index becomes lower. The beam diameter of the optical signal may decrease, while passing through the second cores 137 of the second spot size converter 134. Accordingly, the optical signal, which has the larger beam diameter while passing through the first cores 136, may have the smaller beam diameter again, while passing through the second cores 137. In comparison to those provided consecutively, the second cores 137 provided separately from each other has an advantage of reducing the magnitude of the optical signal not only in the horizontal direction, but also in the vertical direction.

Although not shown in the drawing, similarly to the first and second spot size converters 132 and 134, the third and fourth spot size converters 142 and 144 (see FIG. 1) of the second path 140 (see FIG. 1) may also include segmented cores.

Figure 2B:
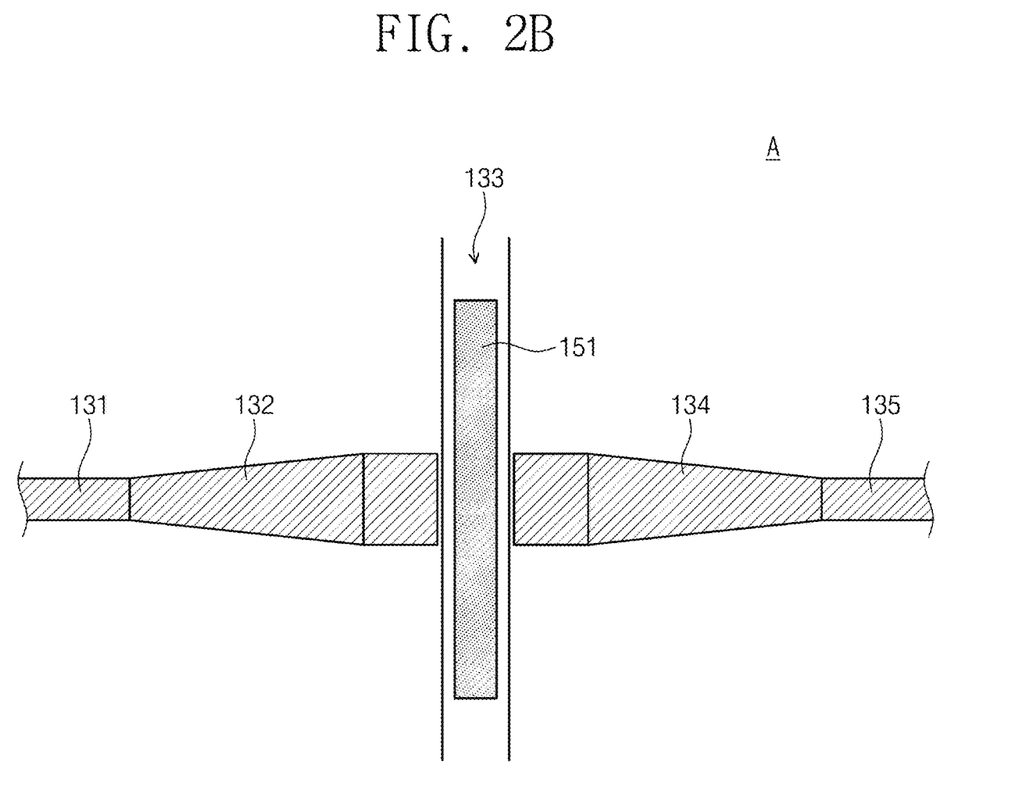
FIGS. 2B and 2C are drawings for describing other embodiments of a spot size converter.
Figure 2C:
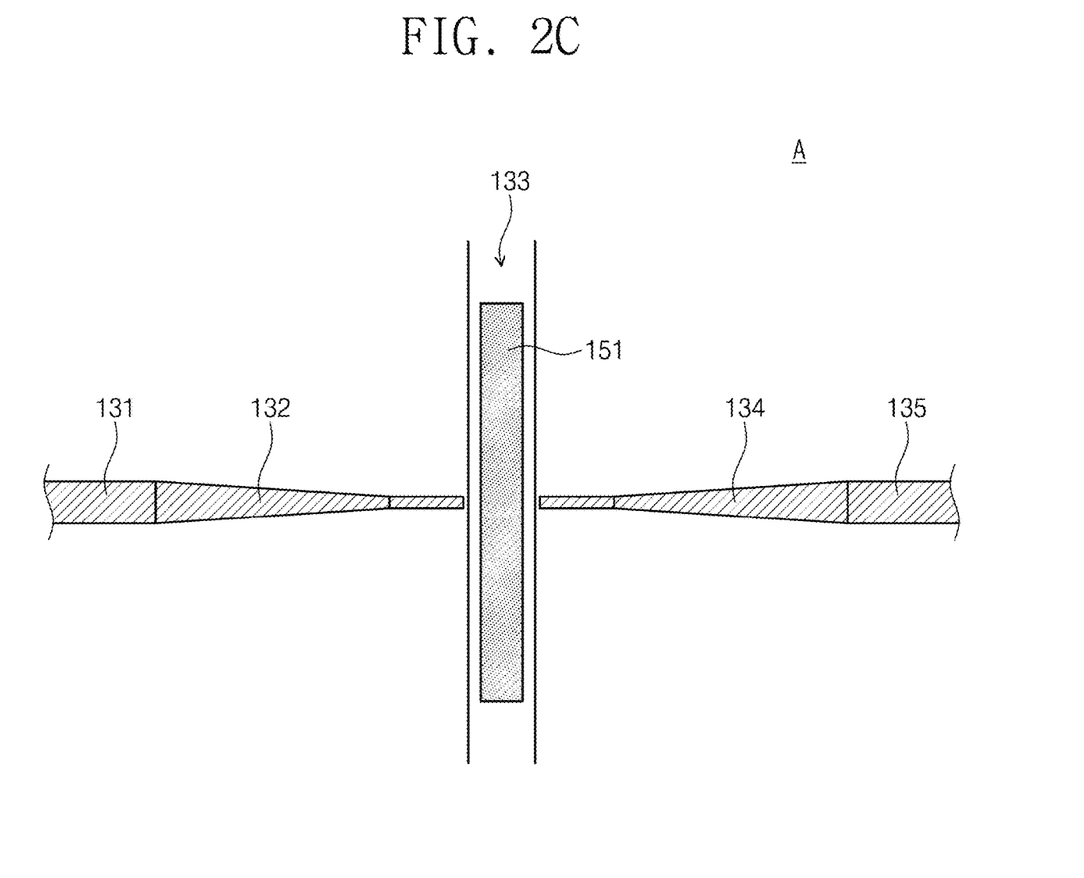

FIGS. 2B and 2C are drawings for describing other embodiments of a sport size converter.

In relation to FIG. 2B, as the first spot size converter 132 is closer to the first input waveguide 131, the width thereof may become thin. As the first spot size converter 132 is closer to the first slit 133, the width may become thicker. While the optical signal passes through the first spot size converter 132, the magnitude thereof may become larger. As the second spot size converter 134 is closer to the first output waveguide 135, the width thereof may become thinner. As the second spot size converter 134 is closer to the first slit 133, the width may become thicker. While the optical signal passes through the second spot size converter 134, the magnitude thereof may become smaller.

In relation to FIG. 2C, as the first spot size converter 132 is closer to the first input waveguide 131, the width thereof may become thicker. As the first spot size converter 132 is closer to the first slit 133, the width may become thinner. While the optical signal passes through the first spot size converter 132, the magnitude thereof may gradually become larger. As the second spot size converter 134 is closer to the first output waveguide 135, the width thereof may become thicker. As the second spot size converter 134 is closer to the first slit 133, the width may become thinner. While the optical signal passes through the second spot size converter 134, the magnitude thereof may gradually become smaller.

In relation to FIGS. 2A to 2C, the optical signal may pass the first slit 133. The reflection ratio of the optical signal may become different according to a material provided to fill the first slit 133.

A reflection coefficient R of the optical signal, which passes through the first spot size converter 132, the first slit 133, and the second spot size converter 134, may be obtained according to the following Equation (1).

$$R = ((n_2 - n_1)/(n_2 + n_1))^2 \qquad (1)$$

Here, when the optical signal is incident to the first slit 133 from the first spot size converter 132, $n_1$ denotes a refractive index of a material included in the first spot size converter 132, $n_2$ denotes a refractive index of a material provided to fill the first slit 133, and R denotes a reflection coefficient of the optical signal at the interface between the first spot size converter 132 and the first slit 133. When the optical signal is incident to the second spot size converter 134 from the first slit 133, $n_1$ denotes a refractive index of a material provided to fill the first slit 133, $n_2$ denotes a refractive index of a material included in the second spot size converter 134, and R denotes a reflection coefficient of the optical signal at the interface between the first slit 133 and the second spot size converter 134.

When the material provided to fill the first slit 133 is the air, the difference between $n_1$ and $n_2$ may be large. Accordingly, the reflection coefficient R of the optical signal may be large. In other words, the reflection ratios of the optical signal may be large at the interfaces between the first slit 133 and the first and second spot size converters 132 and 134.

In order to reduce the reflection ratio of the optical signal, the first slit 133 may be filled with a refractive index matching epoxy. After being filled in the first slit 133, the refractive index matching epoxy having a flexible property may be degenerated to have a hard property (cured) by heat or an ultraviolet ray. In other words, the hardness of the refractive matching epoxy may be changed. When the material provided to fill the first slit 133 is a refractive index matching epoxy, the difference between $n_1$ and $n_2$ may be relatively smaller. Accordingly, the reflection coefficient R of the optical signal decreases. In other words, the reflection ratios of the optical signal may be relatively small at the interfaces between the first slit 133 and the first and second spot size converters 132 and 134. When a material provided to fill the first slit 133 is the refractive index matching epoxy, the optical signal may sequentially pass through the first spot size converter 132, the refractive index matching epoxy, the first wave plate 151, the refractive index matching epoxy, the second spot size converter 134. A refractive index of the refractive index matching epoxy may be determined according to refractive indexes of the first spot size converter 132, the first waveplate 151, and the second spot size converter 134. Due to the refractive index matching epoxy, the insertion loss and the reflection loss of the optical signal may be reduced, and a polarization extinction ratio of the optical signal may be easily secured.

Similarly to the first slit 133, the second slit 143 (see FIG. 1) may also be filled with a refractive index matching epoxy.

Figure 3A:
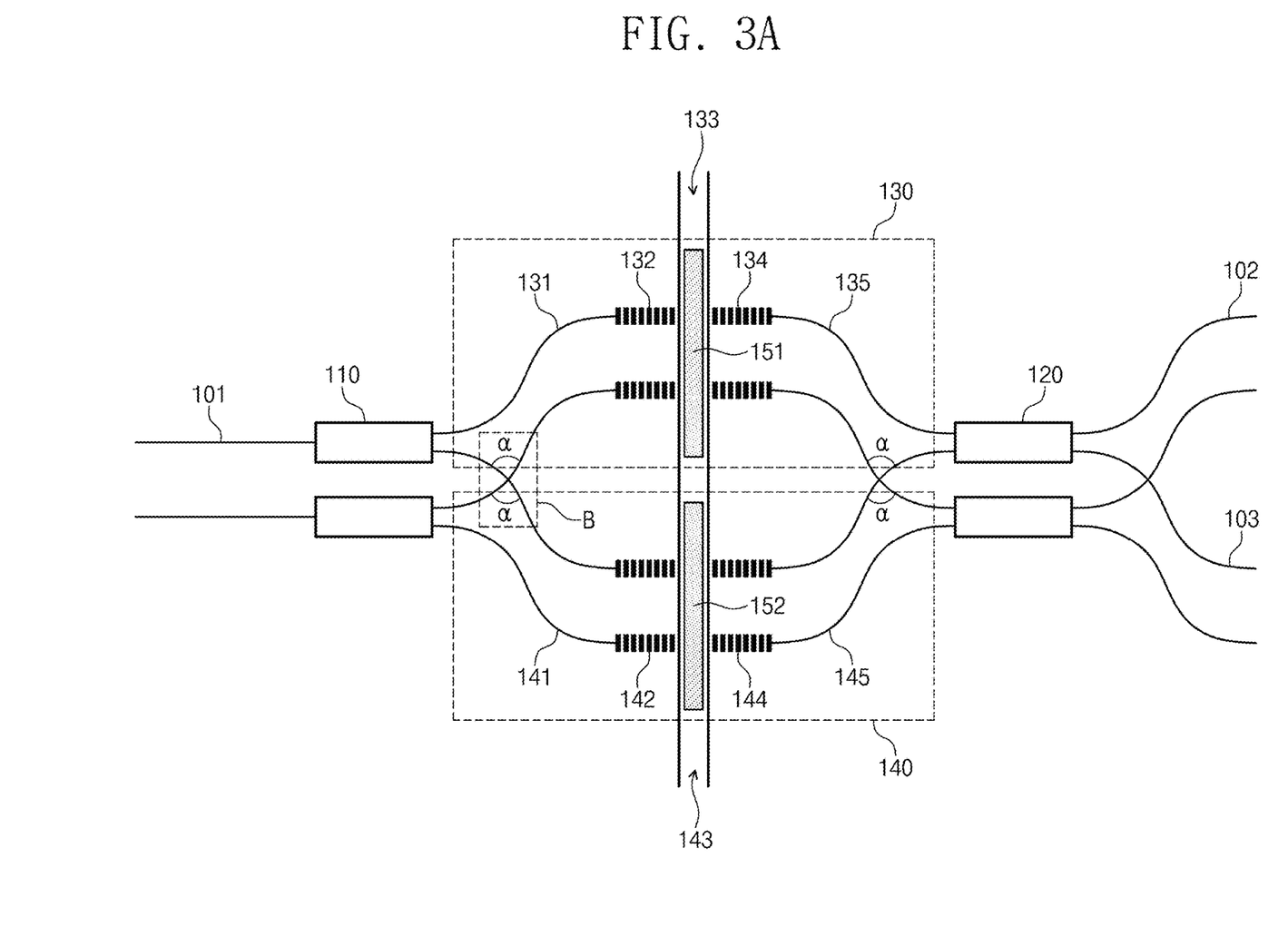
FIG. 3A is a drawing for describing an optical circuit element according to a second embodiment of the inventive concept.
Figure 3B:
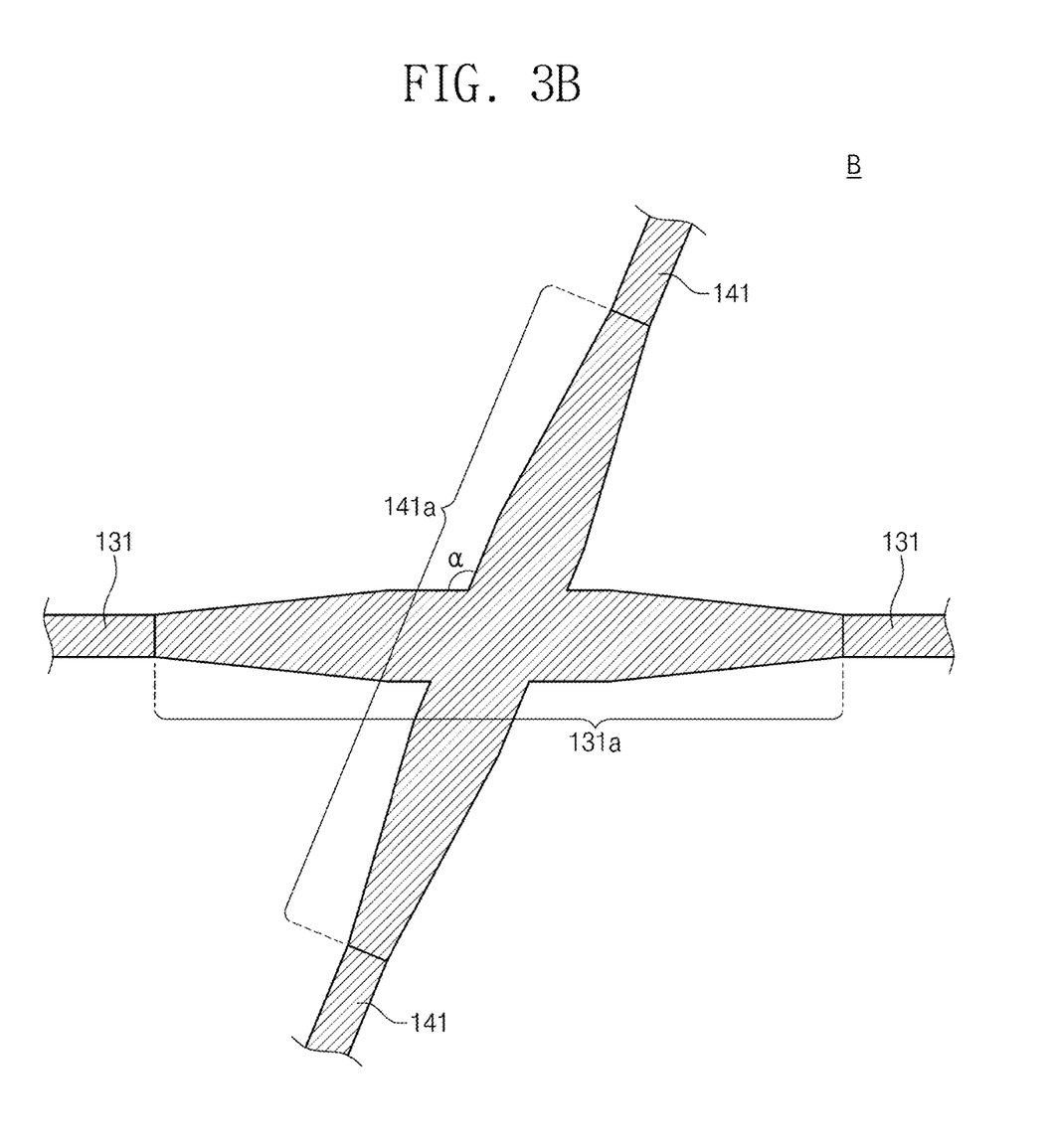
FIGS. 3B and 3C are enlarged views of B region of FIG. 3A for describing a spot size converter disposed at an intersection point of input waveguides.
Figure 3C:
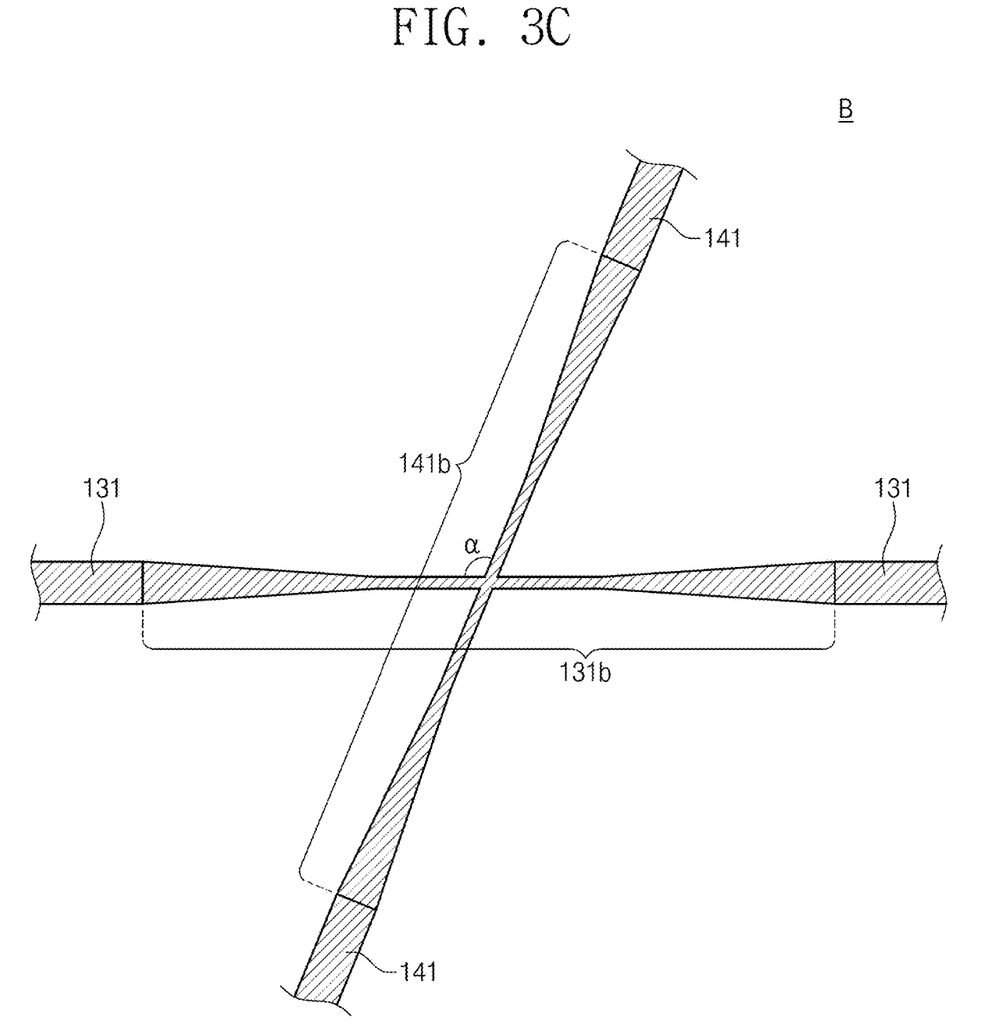

FIG. 3A is a drawing for describing an optical circuit element according to a second embodiment of the inventive concept, and FIGS. 3B and 3C are enlarged views of B region of FIG. 3A for describing a spot size converter disposed at an intersection point of input waveguides.

The optical circuit element according to the second embodiment of the inventive concept is similar to the optical circuit element according to the first embodiment of the inventive concept except descriptions below.

In relation to FIG. 3A, the optical circuit element according to the second embodiment of the inventive concept may include two input couplers 110 and two output couplers 120. It is illustrated that each number of the input couplers 110 and the second couplers 120 is two, but is not limited thereto. Each number of the input couplers 110 and the second couplers 120 can be three or more.

In addition, the first path 130 may include two first input waveguides 131, two first spot size converters 132, the first slit 133, two second spot size converters 134, and two second output waveguides 135.

The second path 140 may include two second input waveguides 141, two third spot size converters 142, the second slit 143, two fourth spot size converters 144, and two second output waveguides 145.

It is illustrated that each number of the first and second input waveguides 131 and 141 of the first path 130 and the second path 140, the first to fourth spot size converters 132, 134, 142, and 144, and the first and second output waveguides 135 and 145 is two, but is not limited thereto.

The length of the first wave plate 151 may be several hundreds of the interval between the first spot size converters 132 and the interval between the second spot size converters 134 may be several tens of IA or shorter, and thus one first wave plate 151 may be inserted between the plurality of first spot size converters 132 and the plurality of second spot size converters 134. Similarly, one second wave plate 152 may be inserted between the plurality of third spot size converters 142 and the plurality of fourth spot size converters 144.

All the elements of the optical circuit elements according to the second embodiment of the inventive concept are provided on a PLC wafer, and thus a part of the first input waveguide 131 and a part of the second input waveguides 141 may intersect with each other on a PLC wafer. In addition, a part of the first output waveguides 135 and a part of the second output waveguides 145 may intersect with each other on a PLC wafer. Accordingly, crosstalk may occur in the optical signal at the intersection point of the first and second input waveguides 131 and 141, and the intersection point of the first and second output waveguides 135 and 145.

The first and second input waveguides 131 and 141, and the first and second output waveguides 135 and 145 may have an intersection angle α. When the intersection angle α is 90 degrees, the crosstalk between the first and second input waveguides 131 and 141, and the first and second output waveguides 135 and 145 may be minimized. In an embodiment, the intersection angle α may be maintained at 30 degrees or more.

In an embodiment, a 1×1 multi-mode interference (MMI) element may be disposed at the intersection point between the first and second input waveguides 131 and 141, and a 1×1 MMI element may be disposed at the first and second output waveguides 135 and 145.

In relation to FIGS. 3A and 3B, in another embodiment, as each of the first and second input waveguides 131 and 141 is closer to the intersection point, the width thereof may become wider. In other words, the first and second input waveguides 131 and 141 may respectively include fifth spot size converters 131a and 141a disposed at the intersection point. The fifth spot size converters 131a and 141a may have a tapered structure. By means of the fifth spot size converters 131a and 141a, each of the first and second input waveguides 131 and 141 may intersect with the other waveguide in the state in which the beam diameter of the optical signal is large, and the optical signal insertion loss and the optical signal crosstalk can be minimized. Similar to the first and second input waveguides 131 and 141, the first and second output waveguides 135 and 145 may respectively include fifth spot size converters having a tapered structure.

In relation to FIGS. 3A and 3B, in another embodiment, as each of the first and second input waveguides 131 and 141 is closer to the intersection point, the width may become narrower. In other words, the first and second input waveguides 131 and 141 may respectively include sixth spot size converters 131b and 141b disposed at the intersection point. The sixth spot size converters 131b and 141b may have an inverse-tapered (down-tapered) structure. By means of the sixth spot size converters 131b and 141b, each of the first and second input waveguides 131 and 141 may intersect with the other waveguide in the state in which the beam diameter of the optical signal is large, and the optical signal insertion loss and the optical signal crosstalk are minimized. Similarly to the first and second input waveguides 131 and 141, the first and second output waveguides 135 and 145 may respectively include sixth spot size converters having an inverse tapered structure.

In another embodiment, the first and second input waveguides 131 and 141 may respectively include spot size converters of a segment structure at the intersection point. Similarly to the first and second input waveguides 131 and 141, the first and second output waveguides 135 and 145 may respectively include spot size converters of a segment structure.

As the optical circuit element according to the first embodiment of the inventive concept, optical signals passing through the first path 130 and the second path 140 of the optical circuit element according to the second embodiment may have the total phase difference of 180 degrees.

Accordingly, the output couplers 120 may respectively output separated first and second polarization signals.

The optical circuit element according to the second embodiment of the inventive concept may receive two or more input optical signals and may emit output optical signals of a double number of the input optical signals only using two wave plates 151 and 152. Accordingly, the cost and time of the process for providing the first and second wave plates 151 and 152 are saved. In addition, an area for inserting the first and second wave plates 151 and 152 may be sufficiently secured.

The optical circuit element according to the second embodiment of the inventive concept may be used in a dual-polarization optical hybrid (DP-OH) of a coherent optical receiver module, a multichannel polarization beam coupler of a coherent optical transmitter module, or the like, and may also be applied in the DP-OH in which a single wavelength or a plurality of wavelengths are used.

Figure 4:
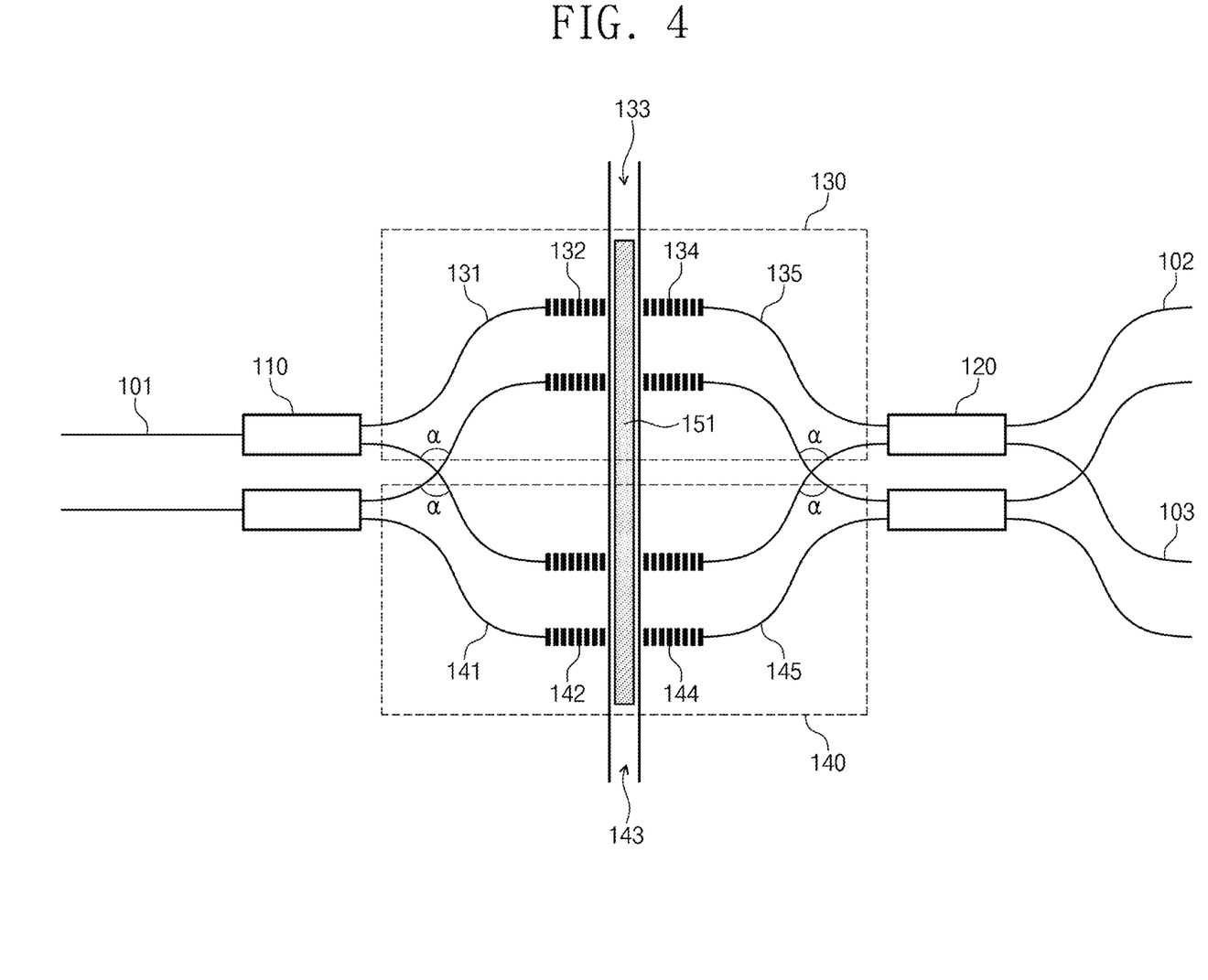
FIG. 4 is a drawing for describing an optical circuit element according to a third embodiment of the inventive concept.

FIG. 4 is a drawing for describing an optical circuit element according to a third embodiment of the inventive concept.

The optical circuit element according to the third embodiment of the inventive concept is similar to the optical circuit element according to the second embodiment of the inventive concept except descriptions below.

In relation to FIG. 4, in the optical circuit element according to the third embodiment of the inventive concept, one first wave plate 151 may be inserted in the first slit 133 and the second slit 143. For example, the first wave plate 151 may be ¼ wave plate. A part of the first wave plate 151 disposed in the first slit 133 may have a first optical axis, and a part of the first wave plate 151 disposed in the second slit 143 may have a second optical axis that has the angle difference of 90 degrees from the first optical axis. Accordingly, first polarization components and second polarization components of the optical signals passing through the first path 130 and optical signals passing through the second path 140 may have the total phase difference of 180 degrees.

The optical circuit element according to the third embodiment of the inventive concept may receive two or more input optical signals and may emit output optical polarization signals of a double number of the input optical signals only using the first wave plate 151.

Figure 5:
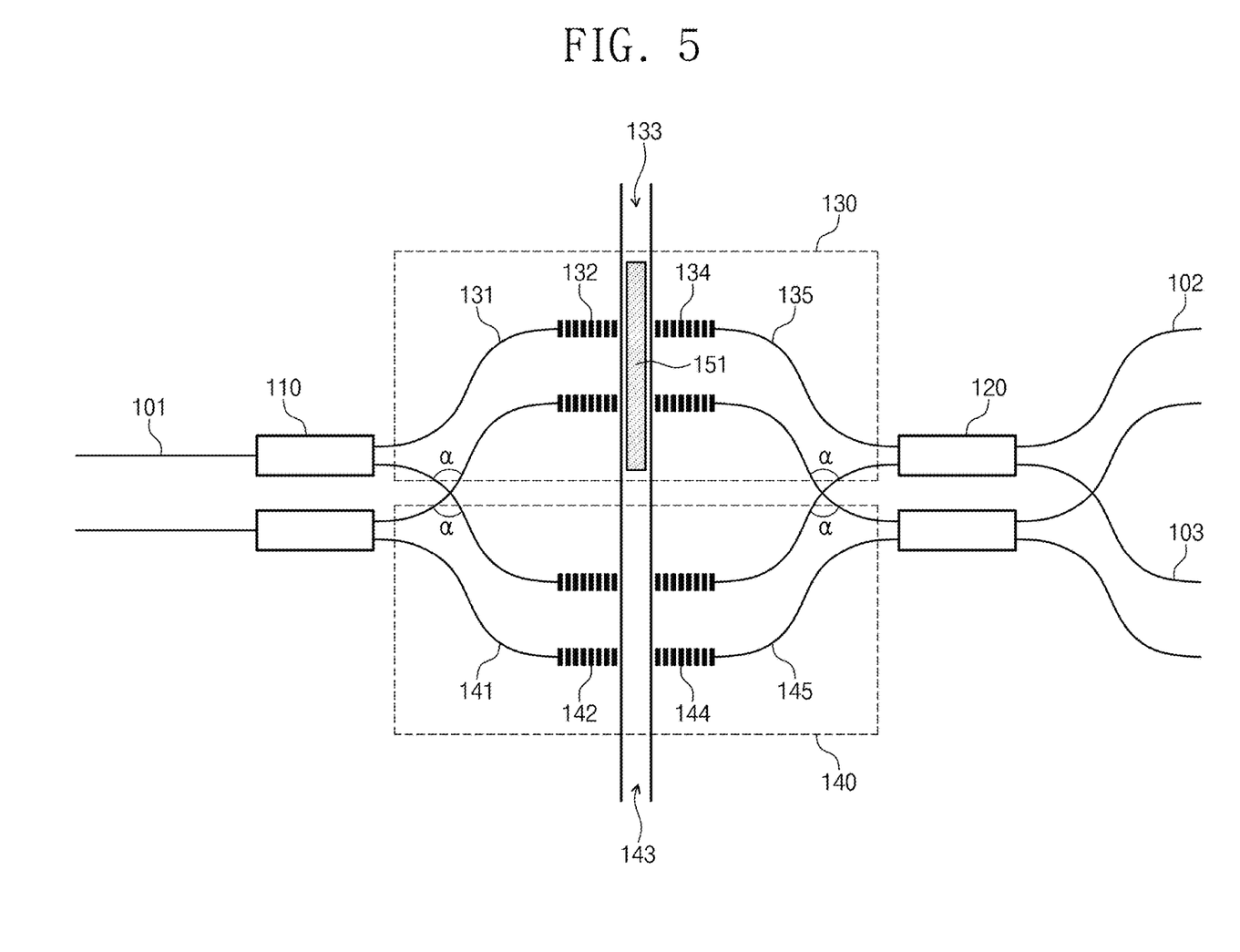
FIG. 5 is a drawing for describing an optical circuit element according to a fourth embodiment of the inventive concept.

FIG. 5 is a drawing for describing an optical circuit element according to a fourth embodiment of the inventive concept.

The optical circuit element according to the fourth embodiment of the inventive concept is similar to the optical circuit element according to the second embodiment of the inventive concept except descriptions below.

In relation to FIG. 5, in the optical circuit element according to the fourth embodiment of the inventive concept, one first wave plate 151 may be inserted into the first slit 133. For example, the first wave plate 151 may be ½ wave plate having a first optical axis. In addition, a wave plate may not be inserted into the second slit 143. Accordingly, the phases of the first polarization component or the second polarization component of the optical signals that pass through the first path 130 may be delayed by 180 degrees. Alternatively, the phases of the first polarization component or the second polarization component of the optical signals that pass through the first path 130 may be advanced by 180 degrees. Consequently, the first polarization component and the second polarization component of the optical signal passing through the first path 130 and the optical signal passing through the second path 140 may have the total phase difference of 180 degrees.

Accordingly, the output couplers 120 may respectively split first and second polarization signals to each output part 102 and 103, respectively.

Figure 6:
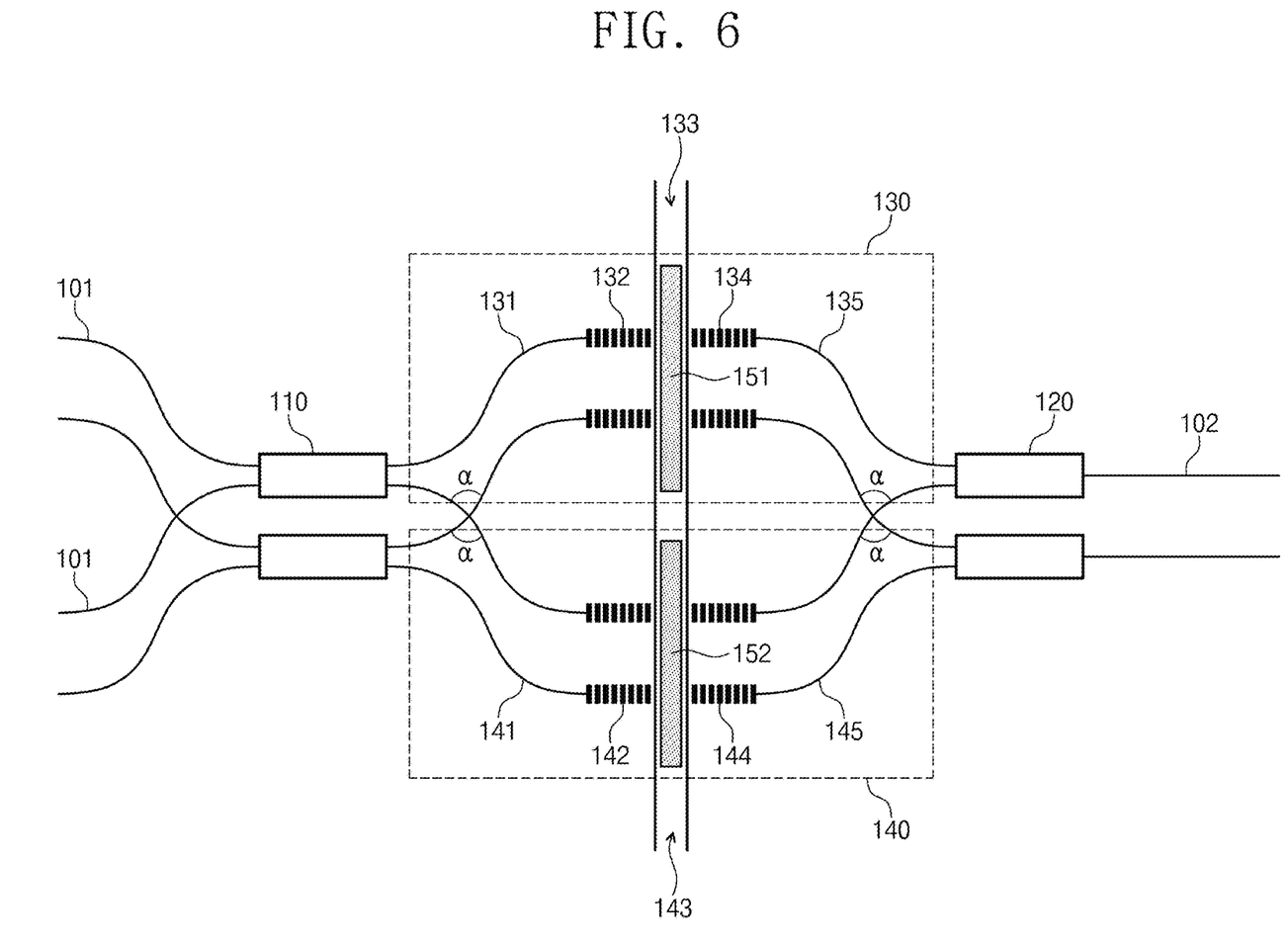
FIG. 6 is a drawing for describing an optical circuit element according to a fifth embodiment of the inventive concept.

FIG. 6 is a drawing for describing an optical circuit element according to a fifth embodiment of the inventive concept.

The optical circuit element according to the fifth embodiment of the inventive concept is similar to the optical circuit element according to the second embodiment of the inventive concept except descriptions below.

A first polarization signal and a second polarization signal, which are coherent and perpendicular to each other may be input to an input coupler 110 to which an optical signal is input from two input parts 101. The first polarization signal and the second polarization signal may have the phase difference of 180 degrees. The input coupler 110 may output an optical signal that includes the first polarization component and the second polarization component to the first input waveguide 131. For example, in the optical signal to be output to the first input waveguide 131, the first polarization component may have the phase advanced by 90 degrees than the second polarization component. The input coupler 110 may output the optical signal including the first polarization component and the second component to the second input waveguide 141. For example, in the optical signal to be output to the second input waveguide 141, the second polarization component may have the phase advanced by 90 degrees than the first polarization component. For example, the first polarization component may be a vertical polarization component, and the second polarization component may be a horizontal polarization component. The output coupler 110 may be a 2×2 directional coupler or a 2×2 multi-mode interference coupler.

The phase difference between the first polarization component and the second polarization component of the optical signal input to the first input waveguide 131 may be removed while passing through the first wave plate 151. The first wave plate 151 may be ¼ wave plate having a first optical axis. The phase difference between the first polarization component and the second polarization component of the optical signal input to the second input waveguide 141 may be removed while passing through the second wave plate 152. The second wave plate 152 may be a ¼ wave plate having a second optical axis that has the angle difference of 90 degrees from the first optical axis. Instead of the first and second wave plates 151 and 152, one wave plate may be provided like the first wave plate 151 of the optical circuit element according to the third and fourth embodiments of the inventive concept.

The output coupler 120 receives two optical signals from the first and second output waveguides 135 and 145, and outputs one optical signal to the output part 102. The output coupler 120 may be a 2×2 directional coupler, or a 2×2 or 2×1 multi-mode interference coupler. Consequently, the first polarization signal and the second polarization signal, which have the phase difference of 180 degrees, are output as one optical signal while passing through the optical circuit element according to the fifth embodiment of the inventive concept. Accordingly, the optical circuit element according to the fifth embodiment of the inventive concept may be a polarization coupler.

According to the embodiments of the inventive concept, the optical circuit element may be provided which may include a spot size converter to minimize an insertion loss caused by a slit for a wave plate.

In addition, according to the embodiments of the inventive concept, the optical circuit element may be provided in which waveguides are suitably disposed to minimize the number of wave plates to be used.

Although the exemplary embodiments of the present invention have been described, it is understood that the present invention may be implemented as other concrete forms without changing the inventive concept or essential features. Therefore, these embodiments as described above are only proposed for illustrative purposes and do not limit the present disclosure.

What is claimed is:

1. An optical circuit element comprising:
a plurality of input couplers to which an optical signal is input;
a plurality of output couplers from which an optical signal is output;
a first path and a second path configured to connect the input couplers and the output couplers to each other; and
at least one wave plate,
wherein the first path comprises a plurality of first input waveguides respectively connected to the input couplers, a plurality of first output waveguides respectively connected to the output couplers, a plurality of first spot size converters respectively connected to the first input waveguides, a plurality of second spot size converters connected to the first output waveguides, and a first slit between the first and second spot size converters,
the second path comprises a plurality of second input waveguides respectively connected to the input couplers, a plurality of second output waveguides respectively connected to the output couplers, a plurality of third spot size converters respectively connected to the second input waveguides, a plurality of fourth spot size converters connected to the second output waveguides, and a second slit between the third and fourth spot size converters,
the at least one wave plate is inserted into at least one of the first and second slits,
the first slit is coplanar with the second slit,
at least one of the first input waveguides and at least one of the second input waveguides intersect with each other, and
at least one of the first output waveguides and at least one of the second output waveguides intersect with each other.

2. The optical circuit element of claim 1, wherein each of the first to fourth spot size converters comprises cores separated from each other.

3. The optical circuit element of claim 1, wherein the first spot size converters and the third spot size converters are separated in parallel so as to minimize the crosstalk, and
the second spot size converters and the fourth spot size converters are separated in parallel so as to minimize the crosstalk.

4. The optical circuit element of claim 1, wherein the first and second slits are provided through a dicing process or a dry etching process.

5. The optical circuit element of claim 1, wherein a thickness of the at least one wave plate is about 8 μm to about 20 μm.

6. The optical circuit element of claim 1, wherein a refractive index matching epoxy of which hardness is changeable is filled in the at least one of the first and second slits.

7. The optical circuit element of claim 1, wherein an intersection angle of the at least one of the first input waveguides and the at least one of the second input waveguides is about 30 to 150 degrees, and
an intersection angle of the at least one of the first output waveguides and the at least one of the second output waveguides is about 30 to 150 degrees.

8. The optical circuit element of claim 1, wherein the at least one of the first input waveguides and the at least one of the second input waveguides respectively have spot size converters disposed at an intersection point, and
the at least one of the first output waveguides and the at least one of the second output waveguides respectively have spot size converters disposed at an intersection point.

9. The optical circuit element of claim 1, wherein the first slit is connected with the second slit.

10. The optical circuit element of claim 1, wherein the one wave plate is inserted in the first slit and the second slit,
a part of the wave plate disposed in the first slit has a first optical axis, and a part of the wave plate disposed in the second slit has a second optical axis that has an angle difference of 90 degrees from the first optical axis, and
the wave plate is a ¼ wave plate.

11. The optical circuit element of claim 1, wherein the wave plate is a ½ wave plate that is inserted into the first slit, but is not inserted into the second slit.

12. The optical circuit element of claim 1, wherein each of the input couplers receives one optical signal, and
each of the output couplers outputs two optical signals.

13. The optical circuit element of claim 1, wherein the at least one wave plate comprises a first wave plate inserted into the first slit and a second wave plate inserted into the second slit, the first wave plate is coplanar with the second wave plate.

14. An optical circuit element comprising:
a plurality of input couplers to which an optical signal is input;
a plurality of output couplers from which an optical signal is output;
a first path and a second path configured to connect the input couplers and the output couplers to each other; and
at least one wave plate,
wherein the first path comprises a plurality of first input waveguides respectively connected to the input couplers, a plurality of first output waveguides respectively connected to the output couplers, a plurality of first spot size converters respectively connected to the first input waveguides, a plurality of second spot size converters connected to the first output waveguides, and a first slit between the first and second spot size converters, the second path comprises a plurality of second input waveguides respectively connected to the input couplers, a plurality of second output waveguides respectively connected to the output couplers, a plurality of third spot size converters respectively connected to the second input waveguides, a plurality of fourth spot size converters connected to the second output waveguides, and a second slit between the third and fourth spot size converters, and the at least one wave plate is inserted into at least one of the first and second slits, wherein a first wave plate is inserted into the first slit, the first wave plate is a ¼ wave plate having a first optical axis, a second wave plate is inserted into the second slit, and the second wave plate is a ¼ wave plate having a second optical axis that has an angle difference of 90 degrees from the first optical axis.

15. An optical circuit element comprising:
a plurality of input couplers to which an optical signal is input;
a plurality of output couplers from which an optical signal is output;
a first path and a second path configured to connect the input couplers and the output couplers to each other; and
at least one wave plate,
wherein the first path comprises a plurality of first input waveguides respectively connected to the input couplers, a plurality of first output waveguides respectively connected to the output couplers, a plurality of first spot size converters respectively connected to the first input waveguides, a plurality of second spot size converters connected to the first output waveguides, and a first slit between the first and second spot size converters, the second path comprises a plurality of second input waveguides respectively connected to the input couplers, a plurality of second output waveguides respectively connected to the output couplers, a plurality of third spot size converters respectively connected to the second input waveguides, a plurality of fourth spot size converters connected to the second output waveguides, and a second slit between the third and fourth spot size converters, and the at least one wave plate is inserted into at least one of the first and second slits, wherein each of the input couplers receives two optical signals, and each of the output couplers outputs one optical signal.

* * * * *